(12) United States Patent
Sekine

(10) Patent No.: US 7,779,179 B2
(45) Date of Patent: Aug. 17, 2010

(54) INTERFACE CONTROLLER, METHOD FOR CONTROLLING THE INTERFACE CONTROLLER, AND A COMPUTER SYSTEM

(75) Inventor: Takuya Sekine, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 262 days.

(21) Appl. No.: 12/164,523

(22) Filed: Jun. 30, 2008

(65) Prior Publication Data

US 2009/0019197 A1   Jan. 15, 2009

(30) Foreign Application Priority Data

Jul. 9, 2007  (JP) .............................. 2007-180074

(51) Int. Cl.
*G06F 3/00* (2006.01)
*G06F 15/16* (2006.01)
*H03K 19/00* (2006.01)
(52) U.S. Cl. .............................. 710/52; 710/39; 326/56; 711/118; 709/232
(58) Field of Classification Search .................. 710/39, 710/52
See application file for complete search history.

(56) References Cited

U.S. PATENT DOCUMENTS

2008/0140882 A1   6/2008   Sekine

*Primary Examiner*—Henry W. H. Tsai
*Assistant Examiner*—Juanito C Borromeo
(74) *Attorney, Agent, or Firm*—Turocy & Watson, LLP

(57) ABSTRACT

An interface controller is connected to a host apparatus and a memory, and receiving multiple responses to one request. The interface controller includes a packet generation unit which adds header data to a request issued by the host apparatus to generate a request packet and outputs the request packet to the memory, a receive buffer which stores a response packet with respect to the request packet, a protocol generation unit which generates a response according to a prescribed protocol based on the response packet stored in the receive buffer, and outputs the response to the host apparatus, a maximum division number calculation unit which calculates a maximum division number of the request issued by the host apparatus, and a request issue control unit which gives a request issue permission to the host apparatus based on the maximum division number calculated by the maximum division number calculation unit, a maximum division number of processed request and a maximum division number of processed response.

19 Claims, 6 Drawing Sheets

FIG. 3A

| TAG | ADDRESS | REQUEST LENGTH |
|---|---|---|
| | REQUEST HEADER | |

FIG. 3B

| TAG | RESPONSE LENGTH | REMAINING DATA LENGTH | RESPONSE DATA |
|---|---|---|---|
| | RESPONSE HEADER | | |

INTERFACE CONTROLLER, METHOD FOR CONTROLLING THE INTERFACE CONTROLLER, AND A COMPUTER SYSTEM

CROSS-REFERENCE TO RELATED APPLICATION

This application is based upon and claims the benefit of priority from the prior Japanese Patent Application No. 2007-180074, filed on Jul. 9, 2007; the entire contents of which are incorporated herein by reference.

BACKGROUND OF THE INVENTION

1. Field of the Invention

The present invention generally relates to an interface controller, a method for controlling the interface controller, and a computer system, and more particularly relates to an interface controller which controls read request and read response carried out between a host apparatus and memory, a method for controlling the interface controller, and a computer system including the interface controller.

2. Related Art

As an interface used to connect a host apparatus (for example, CPU (Central Processing Unit), and a device (for example, memory), there is known the PCI Express (refer to Japanese Patent Laid-Open Publication No. 2005-322308).

At a time of memory read access from a CPU to a memory, a PCI Express interface controller sends to an interface controller of the memory, a packet (hereinafter referred to as "read request packet") for requesting memory read, issued by the CPU, and then receives a packet (hereinafter referred to as "read response packet") including read response data from the memory. In this case, the PCI Express interface controller saves the read response data into a receive buffer and at the same time, performs error check, and if there is no error, outputs response data to a system bus.

However, since read request is continuously issued by the CPU, when the size of read response data from the memory exceeds the storage capacity of the receive buffer, the receive buffer of the interface controller overflows and thus the performance of the interface controller lowers.

To address the above problem, as a technique of improving the performance of the interface controller, there is a method by which the CPU issues read request in view of the size of the receive buffer. In this case, in order to prevent overflow in the receive buffer, the CPU calculates the data size at a time of memory read access based on a side band signal indicating the size, the status, and the like of the receive buffer, and thereby controls the data size.

However, the processing of calculating the data size causes the performance of the CPU to lower. Further, a leased bus used to transmit a side band signal is needed, so the versatility of the whole system lowers.

PCI Express has an advantage by which the device can send back read response divided into multiple packets with respect to each read request. The number of packet divisions is determined by address and data length, and the presence/absence of division depends on the device.

However, since the host apparatus does not perceive the number of packet divisions for each read request, even when the CPU issues read request in view of the size of the receive buffer, when the number of packet divisions for each read request is large, the receive buffer overflows.

SUMMARY OF THE INVENTION

According to the first aspect of the present invention, there is provided that an interface controller connected to a host apparatus and a memory, and receiving multiple responses to one request, the interface controller comprising:

a packet generation unit which adds header data to a request issued by the host apparatus to generate a request packet and outputs the request packet to the memory;

a receive buffer which stores a response packet with respect to the request packet;

a protocol generation unit which generates a response according to a prescribed protocol based on the response packet stored in the receive buffer, and outputs the response to the host apparatus;

a maximum division number calculation unit which calculates a maximum division number of the request issued by the host apparatus; and a request issue control unit which gives a request issue permission to the host apparatus based on the maximum division number calculated by the maximum division number calculation unit, a maximum division number of processed request and a maximum division number of processed response.

According to the second aspect of the invention, there is provided that a method for controlling an interface controller, the method comprising:

adding header data to a request to generate a request packet;

generating a response according to a prescribed protocol based on a response packet;

calculating a maximum division number of the request; and giving a request issue permission based on the maximum division number, a maximum division number of processed request and a maximum division number of processed response.

According to the third aspect of the present invention, there is provided that a computer system comprising:

a memory storing predetermined data;

a host apparatus which issues a request to the memory; and an interface controller for the host apparatus and the memory, the interface controller comprising:

a packet generation unit which adds header data to a request issued by the host apparatus to generate a request packet and outputs the request packet to the memory;

a receive buffer which stores a response packet with respect to the request packet;

a protocol generation unit which generates a response according to a prescribed protocol based on the response packet stored in the receive buffer, and outputs the response to the host apparatus;

a maximum division number calculation unit which calculates a maximum division number of the request issued by the host apparatus; and a request issue control unit which gives a request issue permission to the host apparatus based on the maximum division number calculated by the maximum division number calculation unit, a maximum division number of processed request and a maximum division number of processed response.

BRIEF DESCRIPTION OF THE DRAWINGS

FIG. 3A illustrates a request packet data configuration according to Embodiment 1 of the present invention.

FIG. 3B illustrates a response packet data configuration according to Embodiment 1 of the present invention.

DETAILED DESCRIPTION OF THE INVENTION

Embodiments of the present invention will be described below with reference to the drawings. It is noted that the following embodiments are merely exemplary of the present invention, and are not be construed to limit the scope of the present invention.

Embodiment 1

Firstly Embodiment 1 of the present invention will be described.

Figure 1:
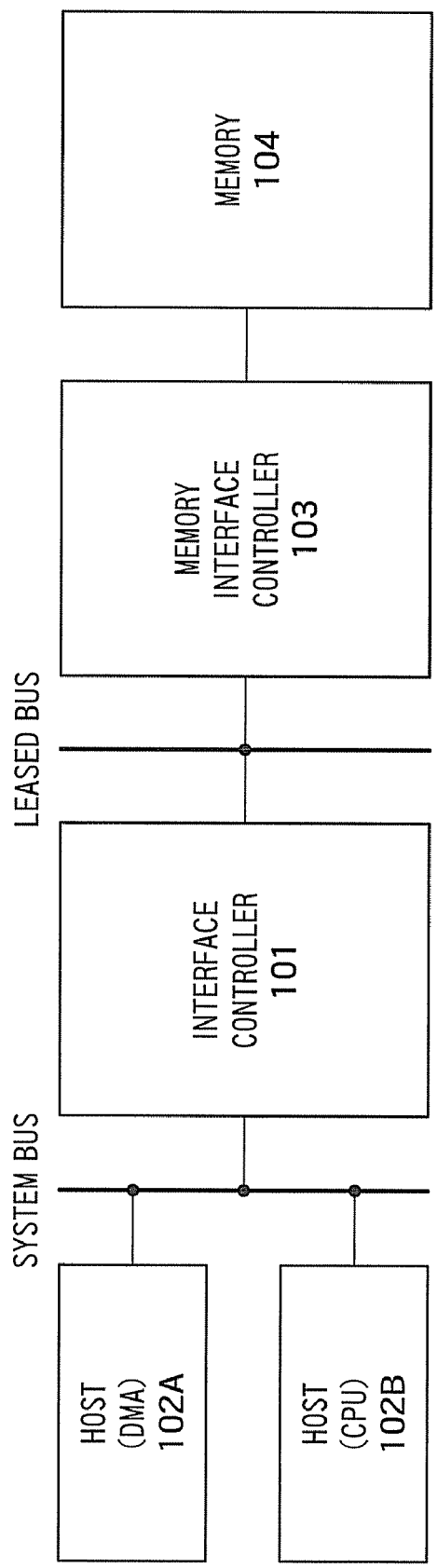
FIG. 1 is a block diagram illustrating a system configuration including a host apparatus and memory according to Embodiment 1 of the present invention.

FIG. 1 is a block diagram illustrating a system configuration including a host apparatus and memory according to Embodiment 1 of the present invention.

The system according to Embodiment 1 of the present invention includes an interface controller 101, host apparatus 102, dedicated interface controller 103, and memory 104.

The interface controller 101 is connected via a system bus to the host apparatus 102, and connected via a leased bus to the memory interface controller 103.

The interface controller 101 controls communication on the system bus and leased bus. The interface controller 101 generates a packet (hereinafter referred to as "request packet") for the leased bus based on a request issued by the host apparatus 102, and sends the request packet via the leased bus to the memory interface controller 103. The interface controller 101 generates a response based on a response packet generated by the memory interface controller 103, and sends the response via the system bus to the host apparatus 102.

The host apparatus 102 is connected via the system bus to the interface controller 101. The host apparatus 102 includes a DMA (Direct Memory Access) 102A and a CPU (Central Processing Unit) 102B.

The DMA 102A issues a request to the memory 104 and receives a response to the request.

The CPU 102B issues a request to the memory 104 and receives a response to the request. The CPU 102B performs arithmetic processing according to a prescribed program and controls a device (not illustrated).

The memory interface controller 103 is connected via the leased bus to the interface controller 101, and connected via an internal bus (not illustrated) to the memory 104.

The memory interface controller 103 controls communication on the leased bus. The memory interface controller 103 reads data stored in the memory 104 based on the request packet generated by the interface controller 101, divides the read data into multiple response packets and sends the response packets via the leased bus to the interface controller 101.

The memory 104 stores data for which a read request is issued by the host apparatus 102.

For example, the system bus is an OCP (Open Core Protocol) bus; and the leased bus is a PCI Express bus.

For example, the request is a read request sent from the host apparatus 102 to the memory 104; and the response is a read response to the read request.

Figure 2:
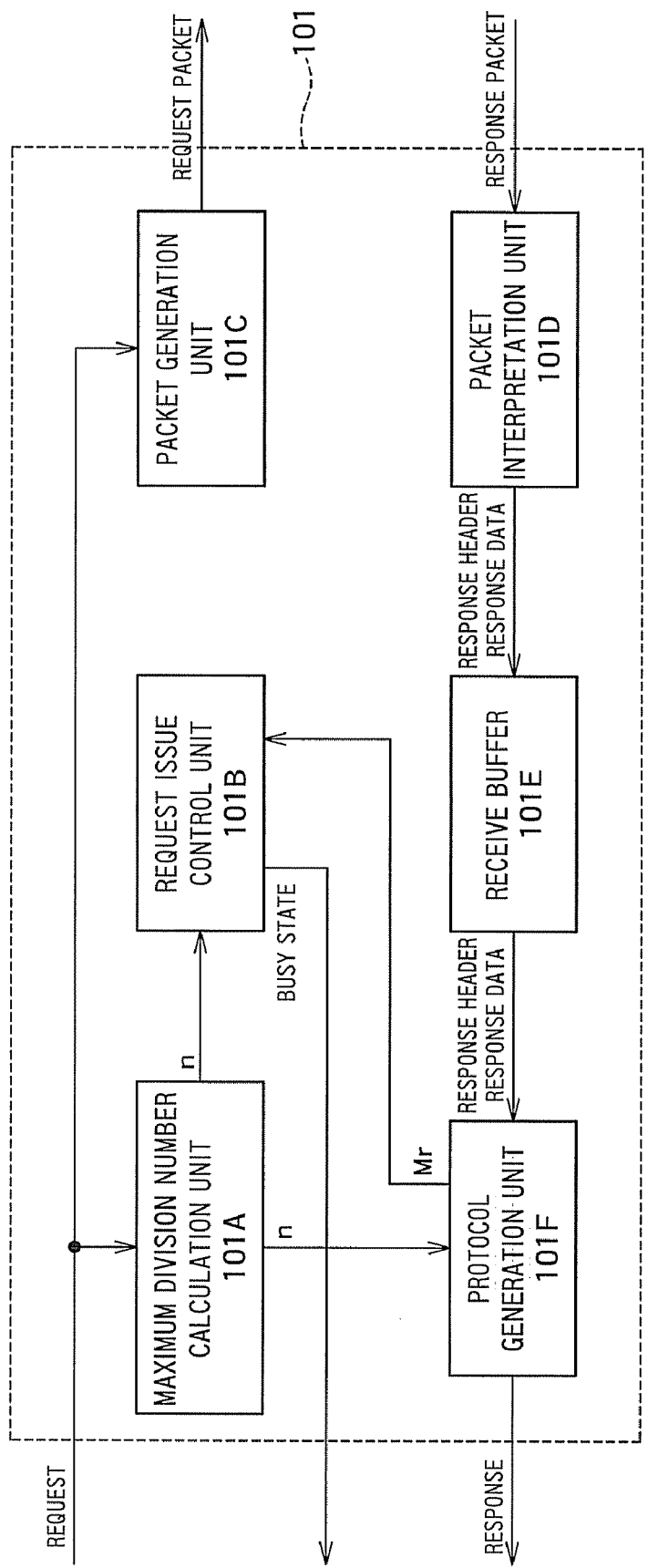
FIG. 2 is a block diagram illustrating a configuration of the interface controller 101 according to Embodiment 1 of the present invention.

FIG. 2 is a block diagram illustrating a configuration of the interface controller 101 according to Embodiment 1 of the present invention.

The interface controller 101 according to Embodiment 1 of the present invention includes a maximum division number calculation unit 101A, request issue control unit 101B, packet generation unit 101C, packet interpretation unit 101D, buffer 101E, and protocol generation unit 101F.

The maximum division number calculation unit 101A calculates maximum packet division number "n" of response to the request based on a request issued by the host apparatus 102, adds thereto a tag to be described later, and outputs the resultant data to the request issue control unit 101B and protocol generation unit 101F.

The request issue control unit 101B registers with a register (not illustrated), the maximum division number "n" outputted from the maximum division number calculation unit 101A and summation Mt of maximum division number of request (hereinafter referred to as "processed request") corresponding to a request packet generated by the packet generation unit 101C.

Upon generation of a request packet by the packet generation unit 101C, the request issue control unit 101B adds the maximum division number "n" to the summation Mt of maximum division number of processed request to update the summation Mt.

The request issue control unit 101B determines whether or not the receive buffer 101E has overflowed, based on the magnitude relation between the sum of the maximum division number "n" outputted by the maximum division number calculation unit 101A and the summation Mt of maximum division number of processed request, and the sum of summation Mr of maximum division number of request (hereinafter referred to as "processed response") corresponding to response outputted to the processed host apparatus 102 and header area size Bh of the receive buffer 101E, and transfers "BUSY STATE" to the host apparatus 102 based on the determination result.

The packet generation unit 101C converts the request issued by the host apparatus 102 into a packet for the leased bus, generates a request packet, and outputs it to the memory 104.

The packet interpretation unit 101D interprets whether or not the response packet outputted from the memory 104 contains an error, and outputs a response header and response data to be described later to the receive buffer.

The receive buffer 101E is partitioned into a header area for storing the response packet header section and a data area for storing the data section. The receive buffer 101E stores the response header outputted from the packet interpretation unit 101D into the header area, and the response data into the data area. When the remaining capacity of the header area is reduced to zero, the receive buffer 101E overflows.

The protocol generation unit 101F reads the response header and response data stored in the receive buffer 101E, generates a response according to a system bus protocol, and sends it to the host apparatus 102. The protocol generation unit 101F associates the maximum division number "n" outputted from the maximum division number calculation unit 101A with a tag to register the number and tag with a register (not illustrated). The protocol generation unit 101F updates the summation Mr of maximum division number of processed response and outputs it to the request issue control unit 101B.

The response is constituted according to the system bus protocol; the response may be constituted only of response data, or may include information indicating the error of response data.

FIG. 3 is a schematic diagram illustrating a packet data configuration according to Embodiment 1 of the present invention.

For example, the packet according to Embodiment 1 of the present invention is a TLP (Transaction Layer Packet).

FIG. 3A illustrates a request packet data configuration according to Embodiment 1 of the present invention. As illustrated in FIG. 3A, the request packet according to Embodiment 1 of the present invention is constituted of a header section including a tag, address, and request data length.

For example, the request packet according to Embodiment 1 of the present invention is a Non Posted Packet.

The tag is data for associating a request packet and response packet, unique for each request packet.

The address is data for identifying a request issue destination, assigned to the memory 104.

The request data length indicates the size of requested data (response to request).

FIG. 3B illustrates a response packet data configuration according to Embodiment 1 of the present invention. As illustrated in FIG. 3B, the response packet data configuration according to Embodiment 1 of the present invention is constituted of a header section including a tag, response data length and remaining data length, and a data section including response data.

For example, the response packet data configuration according to Embodiment 1 of the present invention is a Completion Packet.

The tag is data for associating a request packet and response packet, unique for each request packet associated.

The response data length indicates the size of response data in the data section.

The remaining data length indicates the total data length of response packets which have not been transferred from the memory interface controller 103 to the interface controller 101 and which have the same tag attached thereto.

Figure 4:
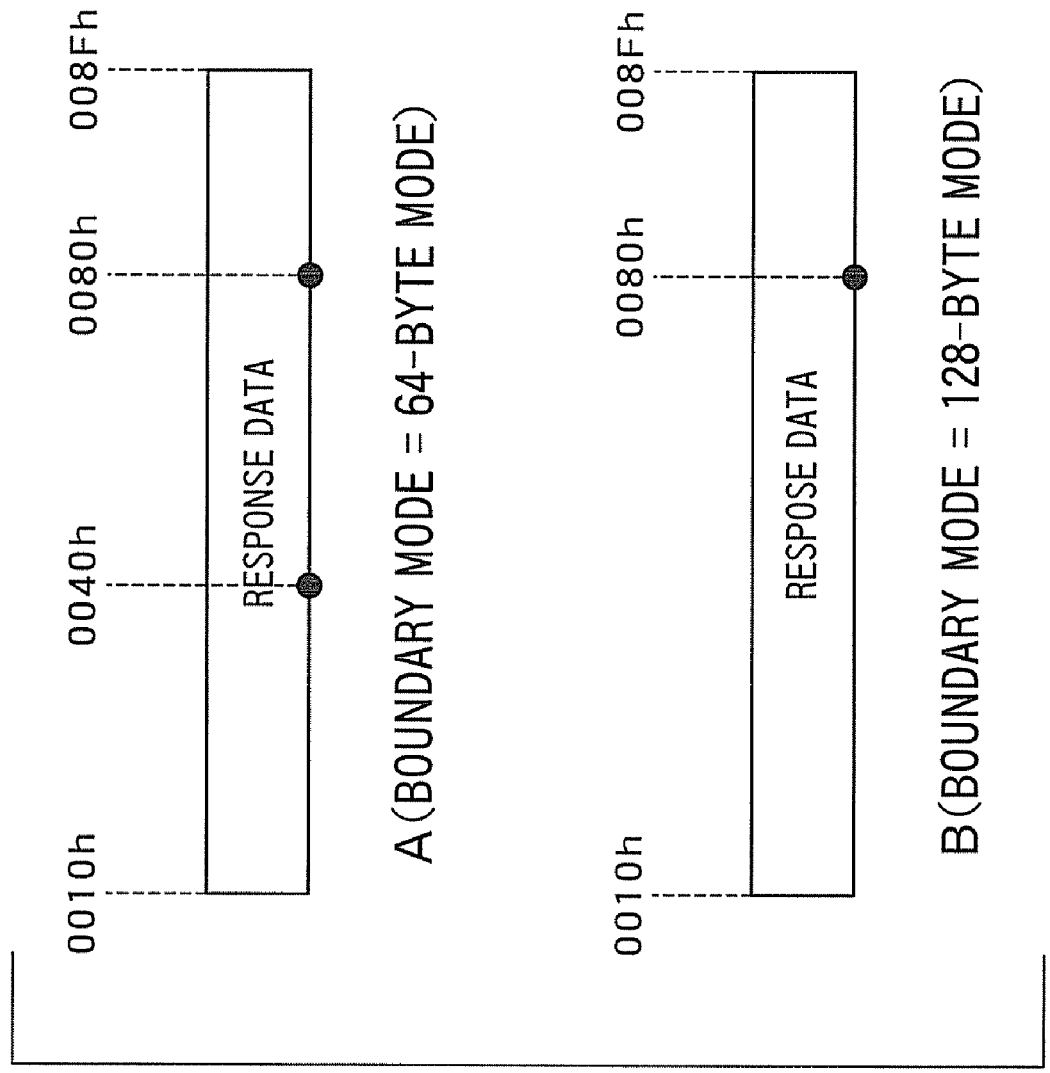
FIG. 4 is an explanatory view for explaining maximum packet division number "n" in the memory interface controller 103 according to Embodiment 1 of the present invention.

FIG. 4 is an explanatory view for explaining maximum packet division number "n" in the memory interface controller 103 according to Embodiment 1 of the present invention.

As illustrated in FIG. 4A, in the memory 104, when the start address of response data is "0010h", the ending address is "008Fh", and the boundary mode of the memory interface controller 103 is 64-byte mode, there are two boundary addresses ("0040h" and "0080h") for the data size of response data and thus maximum division number "n" is 3.

As illustrated in FIG. 4B, in the memory 104, the start address of response data is "0010h", the ending address is "008Fh", and the boundary mode of the memory interface controller 103 is 128-byte mode, there are one boundary address ("0080h") for the data size of response data and thus maximum division number "n" is 2.

In this case, the memory interface controller 103 does not always perform packet division.

The memory interface controller 103 may have multiple boundary modes, and select one of them.

Figure 5:
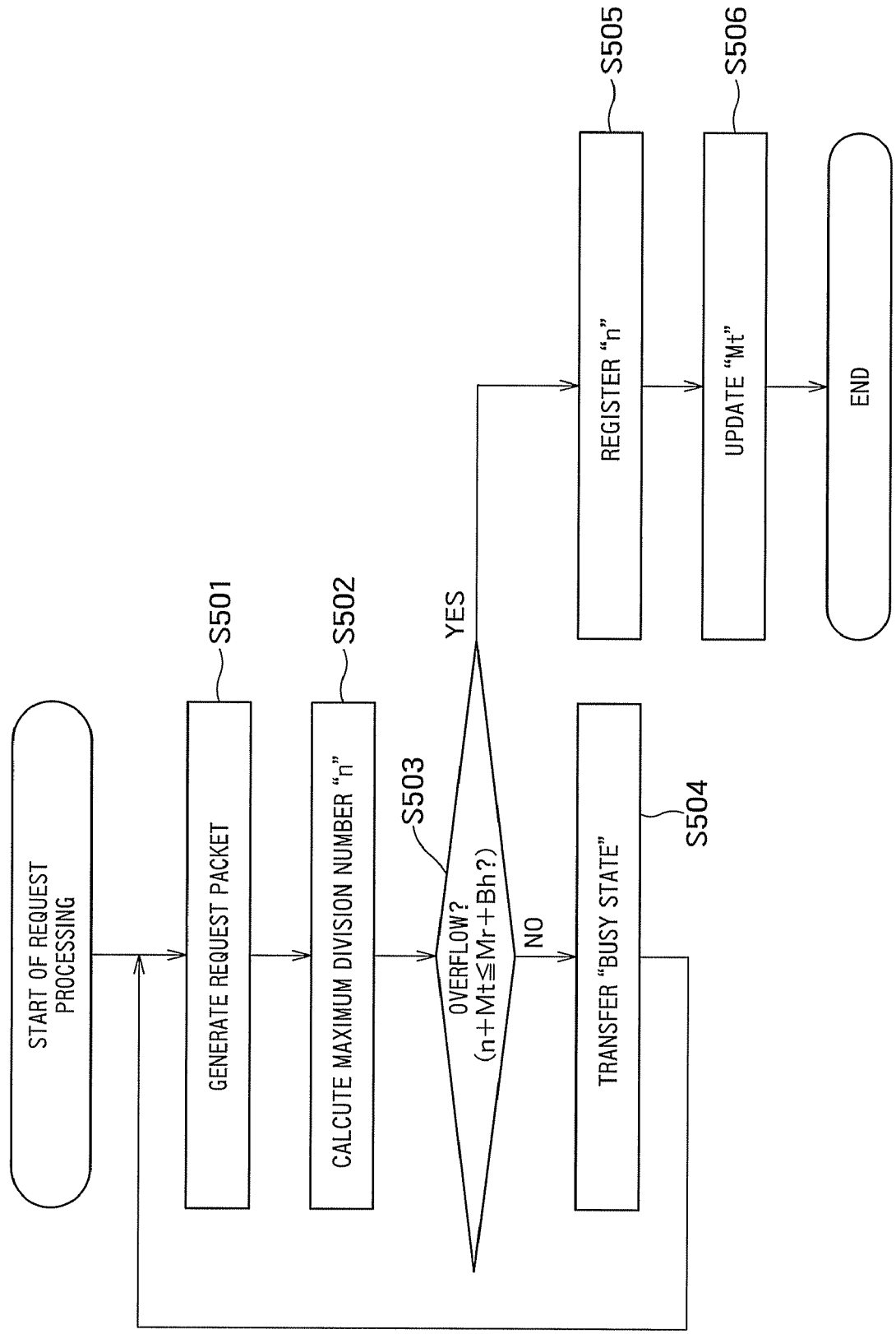
FIG. 5 is a flowchart illustrating a procedure of request processing according to Embodiment 1 of the present invention.

FIG. 5 is a flowchart illustrating a procedure of request processing according to Embodiment 1 of the present invention.

The request processing according to Embodiment 1 of the present invention is one performed by the interface controller 101 when the host apparatus 102 issues a request.

Firstly, the packet generation unit 101C generates a response packet based on a request issued by the host apparatus 102 and sends the response packet via the leased bus to the memory interface controller 103 (S501).

Subsequently, the maximum division number calculation unit 101A calculates maximum division number "n" with respect to the request issued by the host apparatus 102 based on the start address of request and the request size, and outputs the maximum division number "n" to the request issue control unit 101B and protocol generation unit 101F (S502).

Subsequently, the request issue control unit 101B determines whether or not the receive buffer 101E has overflowed, based on the magnitude relation between the sum of the maximum division number "n" and summation Mt of maximum division number of processed request, and the sum of summation Mr of maximum division number of processed response and header area size Bh of the receive buffer (S503).

If "n+Mt" is larger than "Mr+Bh" (NO in S503), the request issue control unit 101B transfers "BUSY STATE" to the host apparatus 102 (S504), and the operation returns to S501.

If "n+Mt" is equal to or smaller than "Mr+Bh" (YES in S503), the protocol generation unit 101F registers the maximum division number "n" outputted from the maximum division number calculation unit 101A, associated with a tag with a register (S505).

Subsequently, the request issue control unit 101B adds the summation Mt of maximum division number of processed request to the maximum division number "n" associated with the tag of the maximum division number "n" registered in S505, and thereby updates the summation Mt of maximum division number of processed request (S506).

After completion of S506, the request processing according to Embodiment 1 of the present invention finishes.

Figure 6:
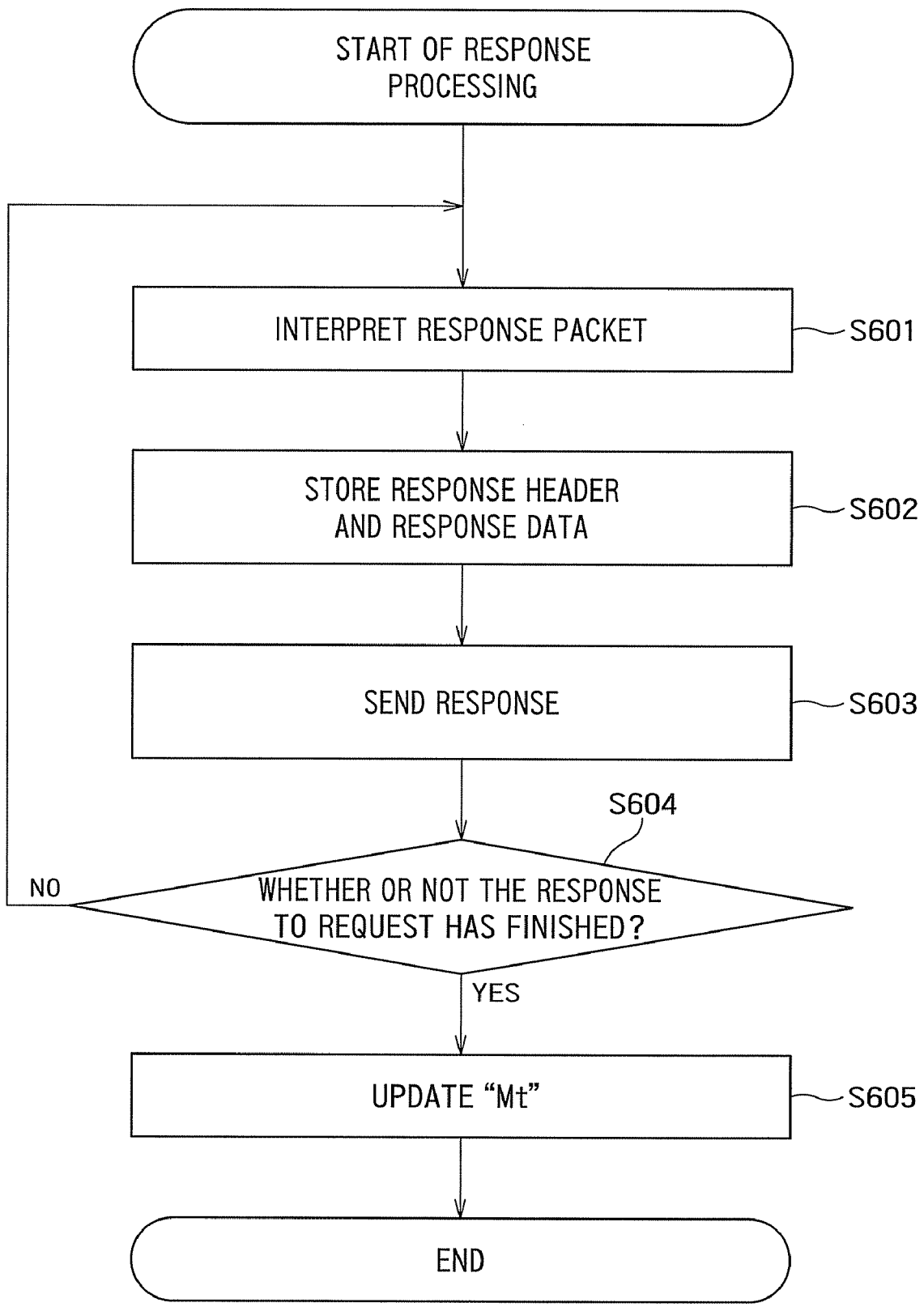
FIG. 6 is a flowchart illustrating a procedure of response processing according to Embodiment 1 of the present invention.

FIG. 6 is a flowchart illustrating a procedure of response processing according to Embodiment 1 of the present invention.

The response processing according to Embodiment 1 of the present invention is one performed by the interface controller 101 when the protocol generation unit 101F outputs a response. Here, the response processing according to Embodiment 1 of the present invention is performed along with the request processing according to Embodiment 1 of the present invention.

Firstly, the packet interpretation unit 101D interprets a response packet, divides the packet into a response header and response data, and outputs them to the receive buffer 101E (S601).

Subsequently, the receive buffer 101E stores the response header outputted from the packet interpretation unit 101D in S601 into the header area, and the response data into the data area (S602).

Subsequently, the protocol generation unit 101F reads the response data from the receive buffer 101E, generates a response according to the system bus protocol, and sends the response to the host apparatus 102 (S603).

Subsequently, the protocol generation unit 101F determines whether or not the response to request has finished (S604). The determination in S604 is performed based on the header section (tag and remaining data length) of response packet. For example, for a response associated with the tag for which the remaining data length is zero, it is determined "finished" (YES in S604).

When the response to request has finished (YES in S604), the protocol generation unit 101F adds the summation Mr of maximum division number of processed response to the maximum division number "n" associated with the tag of a finished response packet from among the maximum division numbers "n" registered in S505 of FIG. 5, and thereby updates the summation Mr of maximum division number of processed response (S605).

When the response to request has not finished (NO in S604), the operation returns to S601.

After completion of S605, the response processing according to Embodiment 1 of the present invention finishes.

Next, an illustrative example of Embodiment 1 of the present invention will be described.

Firstly, there will be described an illustrative example in which the boundary mode of the memory interface controller 103 is 64-byte mode.

As illustrated in FIG. 4A, when the CPU 102B issues a read request to read data from "0000_0010h" to "0000_008Fh", the data extends across "0000_0040h" and "0000_0080h" being boundary addresses in 64-byte mode.

In this case, the memory interface controller 103 can divide the data into up to three response packets and send back the response data with respect to the read request.

In this case, contents of the three response packets are that the first packet contains the response data from "0000_0010h" to "0000_003Fh", the second packet contains the response data from "0000_0040h" to "0000_007Fh", and the third packet contains the response data from "0000_0080h" to "0000_008Fh".

Next, there will now be described an illustrative example in which the boundary mode of the memory interface controller 103 is 128-byte mode.

As illustrated in FIG. 4B, when the CPU 102B issues a read request to read data from "0000_0010h" to "0000_008Fh", the data extends across "0000_0080h" being a boundary address in 128-byte mode.

In this case, the memory interface controller 103 can divide the data into up to two packets and send back the response data with respect to the read request.

In this case, contents of the two response packets are that the first packet contains the response data from "0000_0010h" to "0000_003Fh" and the second packet contains the response data from "0000_0040h" to "0000_008Fh". Alternatively, the first packet may contain the response data from "0000_0010h" to "0000_007Fh" and the second packet may contain the response data from "0000_0080h" to "0000_008Fh".

These boundary modes depend on the memory interface controller 103, so the interface controller 101 cannot identify the number of response packet divisions when generating a response packet.

According to Embodiment 1 of the present invention, the interface controller 101 calculates maximum division number "n" based on the start address and data length of request data, and determines whether or not the receive buffer 101E has overflowed based on the maximum division number "n". Thus, even when there are multiple responses to one request, it is possible to prevent overflow in the receive buffer.

What is claimed is:

1. An interface controller connected to a host apparatus and a memory, and receiving multiple responses to one request, the interface controller comprising:
    a packet generation unit which adds header data to a request issued by the host apparatus to generate a request packet and outputs the request packet to the memory;
    a receive buffer which stores a response packet with respect to the request packet;
    a protocol generation unit which generates a response according to a prescribed protocol based on the response packet stored in the receive buffer, and outputs the response to the host apparatus;
    a maximum division number calculation unit which calculates a maximum division number of the request issued by the host apparatus; and
    a request issue control unit which gives a request issue permission to the host apparatus based on the maximum division number calculated by the maximum division number calculation unit, a maximum division number of processed request and a maximum division number of processed response, wherein the request issue control unit determines whether or not the receive buffer has overflowed, based on a magnitude relation between:
    a first value being a sum of the maximum division number calculated by the maximum division number calculation unit and a summation of the maximum division number of the processed request;
    and a second value being a sum of the maximum division number of the processed response and a header area size of the receive buffer.

2. The interface controller according to claim 1, wherein the maximum division number calculation unit calculates a maximum division number based on address, data length and boundary.

3. The interface controller according to claim 1, wherein the request issue control unit registers the maximum division number calculated by the maximum division number calculation unit and the maximum division number of the processed request, and updates the registered maximum division number of the processed request when a request packet is generated by the packet generation unit.

4. The interface controller according to claim 1, wherein the protocol generation unit registers the maximum division number calculated by the maximum division number calculation unit and the maximum division number of the processed response and updates the registered maximum division number of the processed response.

5. The interface controller according to claim 4, wherein upon completion of outputting of a response to the request, the protocol generation unit updates the registered maximum division number of the processed response.

6. The interface controller according to claim 2, wherein the request issue control unit registers the maximum division number calculated by the maximum division number calculation unit and the maximum division number of the processed request, and updates the registered maximum division number of the processed request when a request packet is generated by the packet generation unit.

7. The interface controller according to claim 6, wherein the protocol generation unit registers the maximum division number calculated by the maximum division number calculation unit and the maximum division number of the processed response and updates the registered maximum division number of the processed response.

8. The interface controller according to claim 7, wherein upon completion of outputting of a response to the request, the protocol generation unit updates the registered maximum division number of the processed response.

9. The interface controller according to claim 3, wherein the protocol generation unit registers the maximum division number calculated by the maximum division number calculation unit and the maximum division number of the processed response and updates the registered maximum division number of the processed response.

10. The interface controller according to claim 9, wherein upon completion of outputting of a response to the request, the protocol generation unit updates the registered maximum division number of the processed response.

11. The interface controller according to claim 6, wherein the protocol generation unit registers the maximum division number calculated by the maximum division number calculation unit and the maximum division number of the processed response and updates the registered maximum division number of the processed response.

12. The interface controller according to claim 11, wherein upon completion of outputting of a response to the request, the protocol generation unit updates the registered maximum division number of the processed response.

13. The interface controller according to claim 1, wherein if the first value is larger than the second value, the request issue control unit transfers BUSY STATE to the host apparatus.

14. A method for controlling an interface controller, the method comprising:
  adding header data to a request to generate a request packet;
  generating a response according to a prescribed protocol based on a response packet;
  calculating a maximum division number of the request;
  giving a request issue permission based on the maximum division number, a maximum division number of processed request and a maximum division number of processed response; and
  determining whether or not a receive buffer has overflowed, based on a magnitude relation between:
  a first value being a sum of the maximum division number calculated by a maximum division number calculation unit and a summation of the maximum division number of the processed request;
  and a second value being a sum of the maximum division number of the processed response and a header area size of the receive buffer.

15. A computer system comprising:
  a memory storing predetermined data;
  a host apparatus which issues a request to the memory; and
  an interface controller for the host apparatus and the memory,
  the interface controller comprising:
  a packet generation unit which adds header data to a request issued by the host apparatus to generate a request packet and outputs the request packet to the memory;
  a receive buffer which stores a response packet with respect to the request packet;
  a protocol generation unit which generates a response according to a prescribed protocol based on the response packet stored in the receive buffer, and outputs the response to the host apparatus;
  a maximum division number calculation unit which calculates a maximum division number of the request issued by the host apparatus; and
  a request issue control unit which gives a request issue permission to the host apparatus based on the maximum division number calculated by the maximum division number calculation unit, a maximum division number of processed request and a maximum division number of processed response, wherein the request issue control unit determines whether or not the receive buffer has overflowed, based on a magnitude relation between:
  a first value being a sum of the maximum division number calculated by the maximum division number calculation unit and a summation of the maximum division number of the processed request;
  and a second value being a sum of the maximum division number of the processed response and a header area size of the receive buffer.

16. The computer system according to claim 15, wherein the maximum division number calculation unit calculates a maximum division number based on address, data length and boundary.

17. The computer system according to claim 15, wherein the request issue control unit registers the maximum division number calculated by the maximum division number calculation unit and the maximum division number of the processed request, and updates the registered maximum division number of the processed request when a request packet is generated by the packet generation unit.

18. The computer system according to claim 15, wherein the protocol generation unit registers the maximum division number calculated by the maximum division number calculation unit and the maximum division number of the processed response and updates the registered maximum division number of the processed response.

19. The computer system according to claim 18, wherein upon completion of outputting of a response to the request, the protocol generation unit updates the registered maximum division number of processed response.

* * * * *